UNITED STATES PATENT OFFICE.

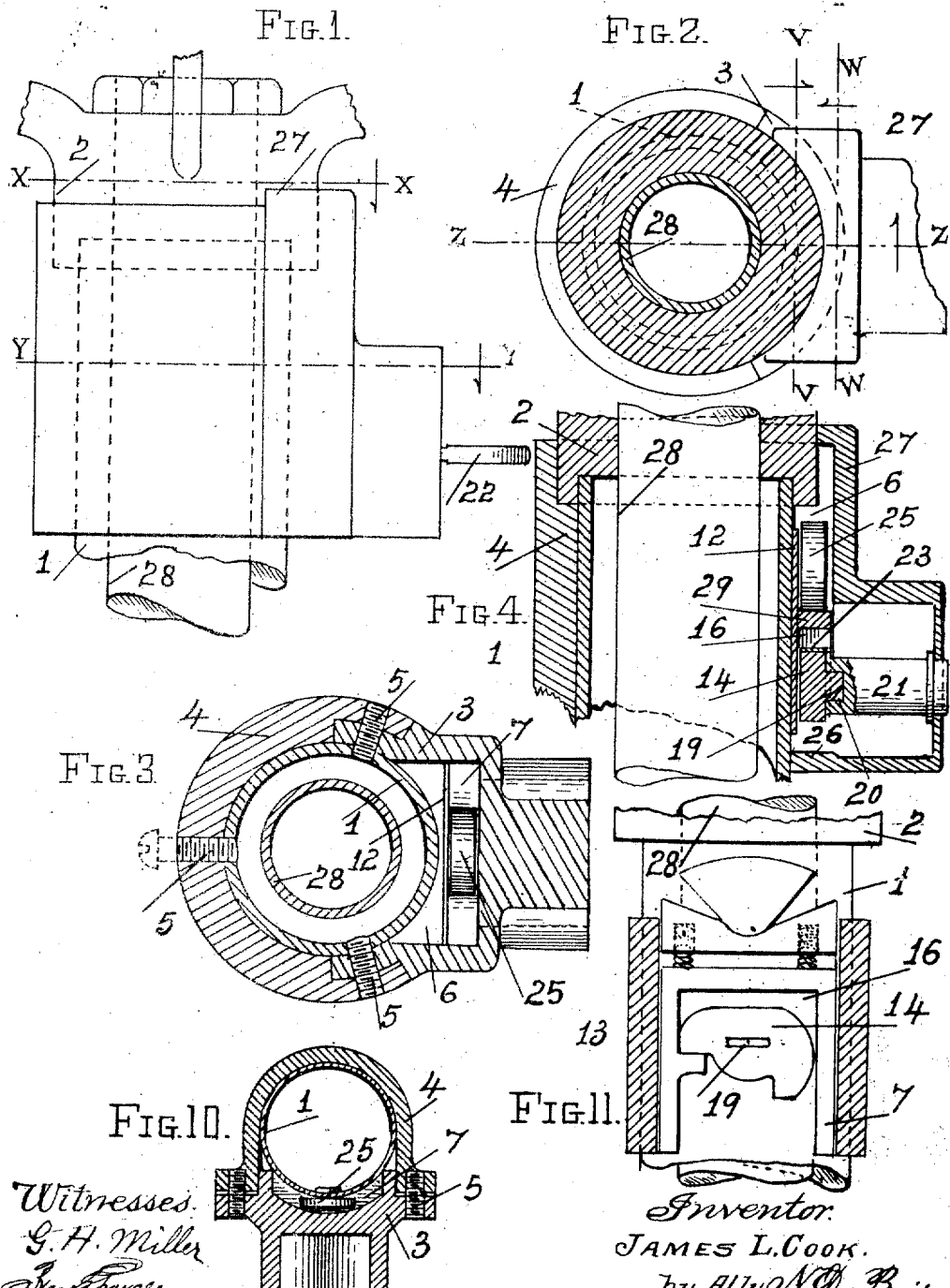

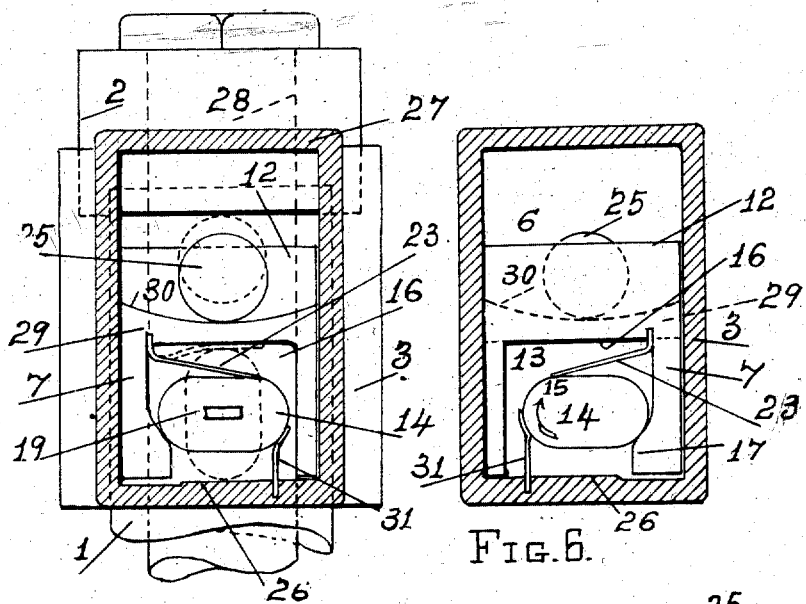
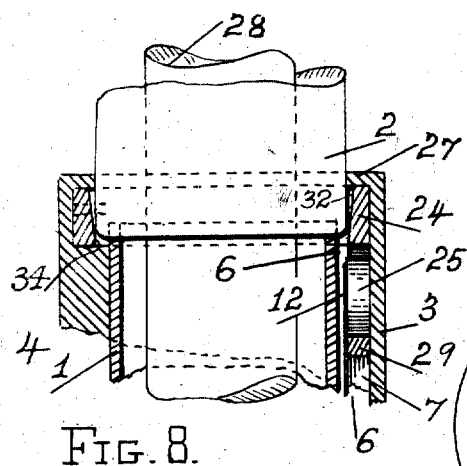
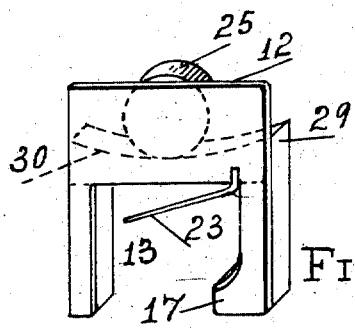
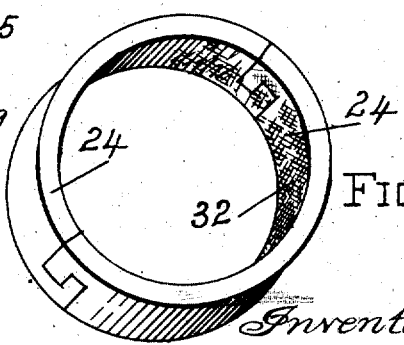

JAMES L. COOK, OF SPRINGFIELD, ILLINOIS.

STEERING-GEAR-LOCKING MECHANISM.

1,248,620.  Specification of Letters Patent.  Patented Dec. 4, 1917.

Application filed January 22, 1917. Serial No. 143,789.

*To all whom it may concern:*

Be it known that I, JAMES L. COOK, a citizen of the United States, residing at Springfield, in the county of Sangamon and State of Illinois, have invented a new and useful Steering-Gear-Locking Mechanism, of which the following is a specification.

My invention relates to locking-mechanism for the steering gear of self-propelling vehicles such as automobiles, boats, etc. The general purpose of the invention is to provide simple and effective lock-controlled means by which the steering gear may be rendered ineffective to guide the vehicle while the steering gear is locked, thus preventing stealing or unauthorized use of the vehicle.

More specific purposes of the invention are: To provide a locking device adapted to be securely connected with the steering column of the vehicle without removing the steering wheel and adapted to lock the steering wheel in any position in which it may be placed; to provide means for firmly engaging and holding by frictional contact the different sizes of hubs of steering wheels such as are in common use, without cutting notches or teeth in the hubs and without matched lugs, or notches or similar engaging devices on the hubs; to provide means for rigidly supporting, in its raised position, the element of the locking mechanism, which coacts with the hub of the steering wheel; to provide means to prevent accidental upward movement of the element of the locking mechanism which acts on the hub of the steering wheel; to provide means whereby the locking mechanism must be placed in locked position before the key can be withdrawn; and to provide other new and useful structural details.

The invention consists in the novel features of construction and combinations of parts shown in the annexed drawings and hereinafter particularly described, and finally recited in the claims.

Figure 1 is a front elevation of the locking mechanism placed on the steering column of an automobile; Fig. 2 is a horizontal transverse section on the line X.X. of Fig. 1; Fig. 3 is a horizontal transverse section on the line Y.Y. of Fig. 1; Fig. 4 is a vertical section on the line Z.Z. of Fig. 2; Fig. 5 is a vertical section on the line W.W. of Fig 2; Fig. 6 is a vertical section on the line V.V. of Fig. 2; Fig. 7 is a perspective view of the slide, detached; Fig. 8 is a diagrammatic sectional view of the mechanism applied on a hub of reduced diameter; Fig. 9 is a perspective view of the clamping ring; Fig. 10 is a reduced sectional view illustrating a casing of modified construction and a slide of modified form; and Fig. 11 illustrates a slide and appurtenances and a wedging device of modified construction.

The same reference numerals designate the same parts in the different views.

The steering column 1 and the hub 2 of the steering wheel are of usual construction; the hub is rigidly connected in the usual manner with the steering shaft 28, which is rotative inside the stationary steering column 1.

The casing is preferably of steel and consists of two members 3 and 4, connected together and connected with the steering column by screw stubs 5. In practice, complete screws 5, one of which is indicated by dotted lines in Fig. 3, will be screwed through the casing and through the wall of the steering column and the projecting headed parts of the screws will be cut off close to the outer surface of the casing and smoothly finished so that the screw stubs cannot be removed by any instrument ordinarily available.

Within the casing-member 3 is a chamber 6 accommodating the slide 7 and appurtenances, so that the slide may have free vertical movement in the chamber. At the upper end of the casing-member 3 is a boxlike extension 27 in contact with part of the periphery of the hub 2 and adapted to prevent access to and tampering with the operating parts housed in the chamber 6. The central and lower parts of the slide 7 are cut away to form an opening as shown at 13 (Figs. 5 and 6) to admit of partial rotation of the elliptical lifting lever 14 in the direction indicated by the arrow 15 to cause the perimeter of the lever to act on the edge 16 of the slide to raise the slide; and to form a curved lug 17 upon which the perimeter of the elliptical lever engages to move the slide downward upon reverse rotation of the lever.

A tenon 19 is integral with the lever 14. The tenon 19 is adapted to occupy a central mortise 20 in the lock cylinder 21, to cause the lever 14 to rotate in unison with the cylinder 21. The lock cylinder 21 may be of any usual or approved construction such that the cylinder can be rotated only when the key 22 is in the cylinder and the key can be withdrawn only when the operating parts of the mechanism are in locked position.

A spring 23 has one end rigidly connected with the slide 7 and the spring is in the vertical plane of the lever 14 and is in contact with the upper edge of the lever when the lever is in unlocked position. The spring 23 is sufficiently rigid to cause the slide to move upward during the first stage of rotation of the lever, until the highest part of the disk 25 stops against the under surface of the hub, and further rotation of the lever causes compression of the spring along the edge 16 of the slide 7 and the spring remains effective to hold the disk 25 in close frictional contact with the under surface of the hub, of the steering wheel. Upon clockwise rotation of the lever it will compress the spring and flatten it along the edge 16 of the slide 7. The function of the spring 23 is to maintain constant contact of the disk 25 with the under side of the hub or with the underside of the gripping ring, as the case may be, when the slide is raised and held in its raised position by the lever 14.

The parts of the locking mechanism are so constructed and arranged that the disk 25 may roll from the center toward the right or from the center toward the left on the inclined upper surface 30 of the ledge 29, and the travel of the disk in either direction will be limited by the side walls of the chamber 6. A thin plate 12, secured on the inner face of the slide, keeps the disk 25 from falling away from the ledge 29.

When the mechanism is unlocked, the disk is free to roll in either direction and the travel of the disk on the ledge will cause the disk to rise as it ascends the inclined surface on either side of the center of the ledge, but the disk cannot rise so high that its highest part will contact with the under surface of the hub while the lowest part of the disk is in contact with the inclined surface of the ledge. When the mechanism is locked, the slide 7 will be in its raised position, the lowest point of the disk will be at the juncture of the inclined upper surfaces 30 of the ledge 29 and the highest point of the disk will be in close frictional contact with the under surface of the hub, or with the enlargement used on the hub, so that any attempt to rotate the steering wheel in either direction will cause the disk to bind on the inclined surface of the ledge and on the under surface of the hub, or its enlargement, and thereby securely lock the wheel. Here it is to be noted that when the slide 7 is in its raised position, the spring 23 acting on the upper end of the lever 14, which is then stationary, tends to raise the slide to keep the highest point of the disk 25 always in spring-pressed contact with the under surface of the hub, or its enlargement, so that the disk cannot fall away from the hub so long as the mechanism remains locked, and so that any slight partial rotation of the hub will cause the disk to bind on the under surface of the hub, or its enlargement, and on the inclined surface of the ledge.

It is also to be noted that the ledge having inclined upper surfaces, and the disk adapted to roll on the inclined surfaces of the ledge constitute co-acting wedging devices adapted to prevent rotation of the steering wheel in either direction.

The wedging device is adapted to co-operate with the hub 2 and the lever 14, and in its preferred form comprises the basal member 29 having converged contact surfaces 30; a rolling member 25 adapted to roll on the converged contact surfaces; and resilient means 23 adapted to maintain due operative relation between the parts 2, 25, 29 and 14, substantially as described. In Fig. 6 of the drawing I have shown the basal member 29 integral with the slide 7 and the spring 23 connected with the basal member, but it is obvious that the basal member may be separate from the slide and the resilient member or members may be between the basal member and the slide, as shown in Fig. 11, without departure from my invention.

On one side of the slide 7 is a transverse ledge 29 having an inclined upper surface 30 which supports the rolling disk 25. When the parts are in the unlocked position shown in Figs. 4 and 5, the highest part of the edge of the disk will be a considerable distance below the under surface of the hub 2. A spring 31 acts upwardly against one end of the lever 14 to hold the other end of the lever against the lug 17 to prevent accidental upward movement of the slide 7, which might result from jolting of the vehicle if means were not provided to prevent it; and might cause untimely contact of the disk 25 with the steering wheel and consequent locking of the steering gear.

The steering wheels of some vehicles have hubs which extend only a little distance beyond the circumference of the steering column, (Fig. 8) not enough to permit the disk 25 to engage directly on the under surface of the hub. In such cases it is necessary to provide means which may be applied to the hub of the wheel, without detaching the wheel from the steering column to enlarge the diameter of the hub sufficiently for the disk to engage on the enlargement of the hub and lock the hub the same as if the engagement were directly on the under surface of the full size hub. This hub-enlarging device and the mode of attaching same will now be described.

A split ring comprising two interlocking sections 24 (Fig. 9) is adapted to surround the hub 2 and fit loosely in the recess 34 in the sectional casing. The inner surface of the ring has a slightly tapered surface 32 as shown in Fig 8 and is milled as shown in Fig. 9 so that when the ring is placed around the hub in the recess 34 and is slid upward, the ring will bind on the periphery of the hub and will securely hold the ring against rotation on the hub. The upward sliding of the ring and its close contact with the hub will be effected before drilling the holes for the screws 5 which connect the casing with the steering column and when the parts have been assembled and the casing has been secured on the steering column, the disk 25 will act on the under side of the ring 24 to cause the locking of the wheel exactly as it would if the hub were of full size.

The operation of the mechanism is as follows: To lock the steering gear the key 22 will be inserted in the cylinder 21 and will be turned to partially rotate the cylinder and cause a quarter rotation of the lever 14 in clockwise direction; the first stage of rotation of the lever will partially raise the slide 7 and further rotation of the lever will further raise the slide to compress the spring 23 along the edge 16 of the slide 7, until the highest point of the periphery of the disk 25 will be in spring-pressed contact with the under surface of the hub 2, or its enlargement, and the lower end of the lever 14 will be in firm contact with the ledge 26 so that the slide will be firmly supported in its raised position.

To unlock the mechanism the procedure will be reversed.

Having fully set forth my invention and its mode of operation, what I claim and desire to secure by Letters Patent is:

1. In a steering-gear locking-mechanism the combination of a steering-shaft; a steering wheel adapted to control rotation of the steering shaft; a spring pressed wedging device comprising a first member having converged contact surfaces and a second member adapted to roll on the converged contact surfaces of said first member; and means adapted to advance the wedging device to effect close frictional contact of the rolling member of the wedging device with the steering wheel to prevent rotation of the steering wheel in either direction, also adapted to retract the wedging device to permit free rotation of the steering wheel in either direction.

2. A wedging device for steering-gear locking-mechanism adapted to coöperate with the steering wheel of a steering-gear mechanism and comprising a basal member having converged contact surfaces, a rolling member adapted to roll on the converged contact surfaces of the basal member, and resilient means adapted to maintain due operative relation of the rolling member of the wedging device relative to the steering wheel of the steering gear mechanism with which the wedging device coöperates.

3. In a steering-gear locking-mechanism, the combination of a steering column, a steering wheel normally rotative on an axis in line with the axis of the steering column, a casing permanently attachable to the steering column without disturbing the steering wheel, a lock cylinder rotative in the casing, an oscillative lever actuated by the lock cylinder, a slide movable in the casing, a wedging device mounted on the slide and adapted for frictional engagement with the steering wheel, a spring connected with the slide and co-acting with the lever to move the slide to cause the wedging device to engage on the steering wheel, and a stationary ledge positioned to be engaged by the lever to keep the wedging device in close frictional contact with the steering wheel while the mechanism is in locked position.

4. In a steering-gear locking-mechanism, the combination of a steering column, a steering wheel rotative on an axis in line with the axis of the steering column and immovable in the longitudinal direction of the column, a slide movable in the longitudinal direction of the column and having an opening adapted to accommodate an oscillative lever, also having an internal projection, a wedging device carried by the slide and adapted for frictional engagement with the steering wheel, a spring connected with the slide, and an oscillative lever adapted to co-act with the spring to move the slide to engage the wedging device with the steering wheel and adapted to engage with the projection in the slide to move the slide away from the steering wheel and keep the wedging device away from the steering wheel.

5. In a steering-gear locking-mechanism adapted for use in conjunction with a steering wheel and a steering shaft controlled by the steering wheel; the combination of a wedging device having a rolling member adapted for close frictional engagement with the steering wheel; means adapted to advance the wedging device to keep the rolling member thereof in close frictional engagement with the steering wheel to prevent rotation of the steering wheel in either direction, also adapted to retract the wedging device to disengage the rolling member thereof from the steering wheel to permit free rotation of the steering wheel in either direction.

6. In an appliance of the class described, the combination of a steering wheel having a flat contact surface; a slide capable of determinate bodily movement toward and away from the flat contact-surface of the steering wheel and having converged bearing-surfaces; a circular member adapted to roll on the converged surfaces of the slide and capable of frictional engagement on the flat contact-surface of the steering wheel; and a spring adapted to act on the slide to maintain constant frictional contact of said circular member with the flat contact-surface of the steering wheel while the slide is at the limit of its movement toward the flat contact-surface of the steering wheel.

7. In a steering-gear locking-mechanism adapted for use in conjunction with a steering wheel and a steering shaft controlled by the steering wheel; the combination of a spring-pressed wedging device comprising a first member having converged contact surfaces and a second member adapted to roll on the contact surfaces of said first member; and means adapted to advance the wedging device to effect close frictional contact of the rolling member thereof with the steering wheel to prevent rotation of the steering wheel in either direction, also adapted to retract the wedging device to permit free rotation of the steering wheel in either direction.

8. In a steering-gear locking-mechanism adapted for use in conjunction with a steering wheel and a steering shaft controlled by the steering wheel; a wedging device comprising a basal member having converged contact surfaces, a rolling member adapted to roll on the contact surfaces of the basal member and adapted for close frictional engagement with the steering wheel and resilient means for maintaining due operative relation of the rolling member of the wedging device relative to the steering wheel; and means for advancing and retracting the wedging device in a line parallel to the axis of the steering shaft.

9. In a steering-gear locking-mechanism adapted for use in conjunction with an immovable steering column, a steering shaft within the steering column and a steering wheel rigid on the steering shaft and having a flat surface; the combination of a sectional casing attachable permanently to the steering column without disturbing the steering wheel; a wedging device housed in the casing and comprising a rolling member adapted for close frictional engagement with the flat surface of the steering wheel; and means adapted to advance the wedging device in a direction parallel to the axis of the steering column to cause the rolling member of the wedging device to engage on the flat surface of the steering wheel to prevent rotation of the steering wheel in either direction, also adapted to retract the wedging device in a direction parallel to the axis of the steering shaft to disengage the rolling member thereof from the flat surface of the steering wheel to permit free rotation of the steering wheel in either direction.

In witness whereof I have hereunto signed my name at Springfield, Illinois, this 17th day of January, 1917.

JAMES L. COOK.

Witnesses:
R. W. TROXELL,
W. C. KIKENDALL.